United States Patent
Ma et al.

(10) Patent No.: US 10,210,635 B2
(45) Date of Patent: Feb. 19, 2019

(54) RECONSTRUCTION QUALITY ASSESSMENT WITH LOCAL NON-UNIFORMITY IN NUCLEAR IMAGING

(71) Applicant: Siemens Medical Solutions USA, Inc., Malvern, PA (US)

(72) Inventors: Jun Ma, Palatine, IL (US); Alexander Hans Vija, Evanston, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 15/587,266

(22) Filed: May 4, 2017

(65) Prior Publication Data

US 2018/0005412 A1 Jan. 4, 2018

Related U.S. Application Data

(60) Provisional application No. 62/356,427, filed on Jun. 29, 2016.

(51) Int. Cl.
*G06K 9/00* (2006.01)
*G06T 11/00* (2006.01)

(52) U.S. Cl.
CPC ........ *G06T 11/008* (2013.01); *G06T 2210/41* (2013.01)

(58) Field of Classification Search
CPC .......................... G06T 11/003; G06T 2210/41
See application file for complete search history.

(56) References Cited

U.S. PATENT DOCUMENTS

| | | | |
|---|---|---|---|
| 8,674,315 B2 * | 3/2014 | Vija | G06T 11/008 250/363.04 |
| 2005/0254721 A1 * | 11/2005 | Hagiwara | G06T 5/008 382/260 |
| 2012/0119096 A1 * | 5/2012 | Vija | A61B 6/5205 250/370.08 |

\* cited by examiner

*Primary Examiner* — Avinash Yentrapati (57) ABSTRACT

Reconstruction quality is assessed in medical imaging. An amount of local non-uniformity in a distribution of a statistical measure (e.g., MCDF) is determined. The amount indicates a level of reconstruction quality. A more easily understood amount rather than a rendering of MCDF and/or the amount being a function of local artifacts aids a radiologist in recognizing reconstruction quality and determining whether different reconstruction is warranted.

20 Claims, 3 Drawing Sheets

RECONSTRUCTION QUALITY ASSESSMENT WITH LOCAL NON-UNIFORMITY IN NUCLEAR IMAGING

RELATED APPLICATIONS

The present patent document claims the benefit of the filing date under 35 U.S.C. § 119(e) of Provisional U.S. Patent Application Ser. No. 62/356,427, filed Jun. 29, 2016, which is hereby incorporated by reference.

BACKGROUND

The present embodiments relate to nuclear or other medical imaging. Example nuclear imaging modalities include single photon emission computed tomography (SPECT) and positron emission tomography (PET). A radioactive substance is administered to a patient. An imaging detector detects the y-radiation emitted from the patient. The detected emissions are tomographically reconstructed to generate an image object of locations of the emissions in a patient. Due to motion during detection or poor calibration, the reconstructed image object may include artifacts. Different types of reconstruction may address these artifacts, but it may be difficult to recognize that the artifacts exist or may be corrected.

A well-known objective statistical measure for modeling Poisson-distributed radiation counts is the Poisson cumulative distribution function (Poisson CDF). Because the CDF is piecewise constant with discontinuities at integer points, a random component may be added to provide a modified Poisson CDF (MCDF). The MCDF is computed in data space (not image space) and provides a global histogram distribution that may be rendered for viewing. An experienced human observer may be able to recognize the effects of artifacts from the rendered MCDF histogram. Other radiologists may have difficulty recognizing the artifacts even in the rendered MCDF histogram. In some cases, the global histogram is not sensitive to local artifacts or image degradations.

SUMMARY

By way of introduction, the preferred embodiments described below include methods, systems, and non-transitory computer readable media for assessment of reconstruction quality in medical imaging. An amount of local non-uniformity in a distribution of a statistical measure (e.g., MCDF) is determined. The amount indicates a level of reconstruct quality. A more easily understood amount rather than a rendering of MCDF and/or the amount being a function of local artifacts aids a radiologist in recognizing reconstruction quality and determining whether different reconstruction is warranted.

In a first aspect, a method is provided for assessment of reconstruction quality in medical imaging. A nuclear imaging detector detects emissions from a patient. An image object is reconstructed from the emissions. The image object is forward projected to a data model in data space. A modified cumulative distribution function is calculated from the data model. The modified cumulative distribution function has a distribution of values across pixels or voxels. A value is determined for a level of local non-uniformity in the distribution of the modified cumulative distribution function. An indication of a quality of the reconstructing is output. The indication is a function of the value.

In a second aspect, a non-transitory computer readable storage medium has stored therein data representing instructions executable by a programmed processor for reconstruction quality assessment in nuclear imaging. The storage medium includes instructions for: calculating statistical measures of differences between a data model of computed tomography and detected emissions in the nuclear imaging, identifying variation in the statistical measures, and transmitting an indication of the reconstruction quality in the nuclear imaging, the reconstruction quality based on the variation.

In a third aspect, a medical imaging system is provided. A detector is for detecting signals from a patient. A reconstruction processor is configured to reconstruct an image of the signals from the patient and to quantify an amount of non-uniformity in a statistical measure of difference between a data model and the detected signals. A display is configured to display the image and a quality of the reconstruction, the quality being a function of the amount of the non-uniformity.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Reconstruction quality is measured using local non-uniformity in modified cumulative distribution function (MCDF) or other statistical measure for modeling radiation counts or signals. MCDF may be used to measure reconstruction quality. The traditional way is to use the global histogram of MCDF. However, in some cases, the global histogram is not sensitive to local artifacts or image degradation. MCDF local non-uniformity may address this problem or assist those not as adept at determining reconstruction quality from MCDF.

In one embodiment, the regions of local non-uniformity are identified in the MCDF using smoothing, thresholding and morphological operations. The regions form a local non-uniformity mask. A ratio of deviation between the local non-uniformity mask and a global mask is calculated. This ratio of deviation quantitatively measures the reconstruction quality.

The local non-uniformity information (e.g., ratio) is used to indicate if a corresponding reconstructed image is subject to motion, calibration error, or other image degradation. The information may be used to provide a simple value or singular recommendation to try another type of reconstruction to avoid artifacts.

Figure 1:
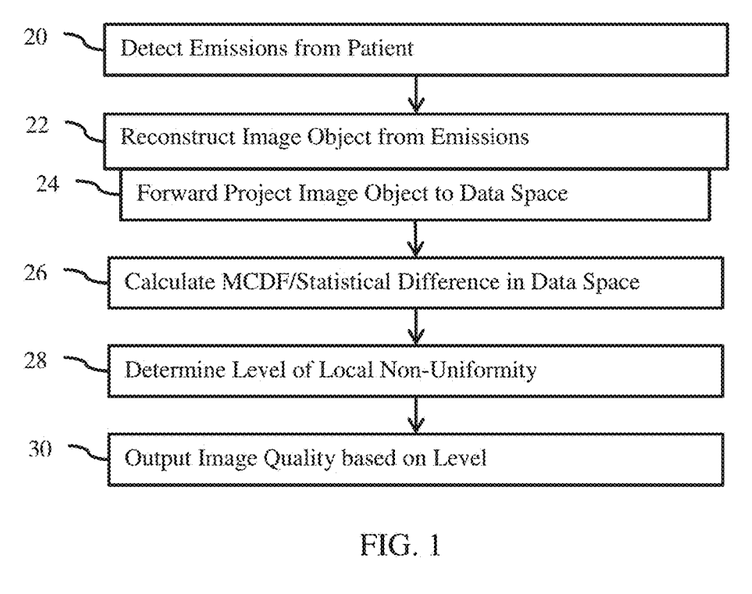
FIG. 1 is a flow chart diagram of one embodiment of a method for assessment of reconstruction quality in medical imaging.

FIG. 1 shows one embodiment of a method for assessment of reconstruction quality in medical imaging. A reconstructed image object is forward projected to data space. A statistical measure (e.g., MCDF) of difference between the resulting data model and measured emissions is used to determine the quality of the reconstruction. To deal with local artifacts or image degradation, local non-uniformity in distribution of the statistical measure is calculated. The resulting value indicates whether other reconstruction approaches should be used and/or provides a simple indication of the quality of the reconstructed image object.

Figure 3:
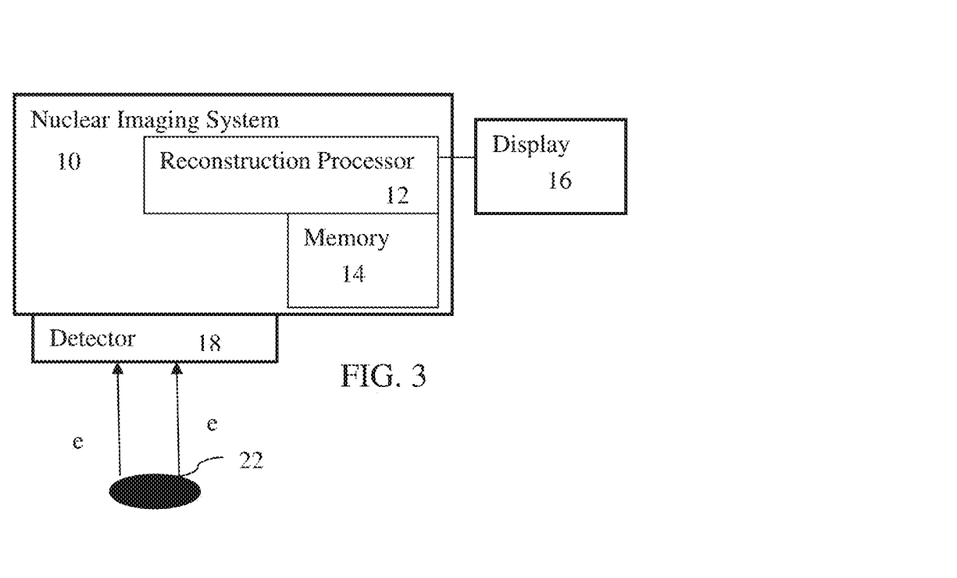
FIG. 3 is a block diagram of a nuclear imaging system, according to one embodiment, for reconstruction quality assessment.

The method is implemented by a nuclear imaging system, such as the nuclear imaging system of FIG. 3. A PET or SPECT imaging system may be used. A detector, such as a gamma camera or ring of detectors, detects emissions in act 20, a reconstruction processor performs acts 22-28, and a display, memory interface, or network interface is used for act 30. Other devices may be used to perform any of the acts. Other types of medical imaging with reconstruction from detected signals may be used, such as computed tomography.

The acts are performed in the order shown (e.g., top to bottom or numerical) or other orders. Additional, different, or fewer acts may be performed. For example, act 20 is not provided where the detected emissions are stored or transferred from memory. As another example, act 30 may not be provided where the quality is used to automatically repeat reconstruction of act 22 with a different type of reconstruction. In other examples, an act for backward projection in addition to act 24 is provided as part of the reconstruction of act 22. In yet another example, forward and backward projection acts are performed as part of the reconstruction of act 22 and the forward projection of act 24 is separately performed from the reconstruction.

In act 20, emissions from a patient are detected. The activity concentration in a patient having received a radiotracer is determined as part of reconstruction by a nuclear imaging system. After ingesting or injecting the radiotracer into the patient, the patient is positioned relative to a detector, and/or the detector is positioned relative to the patient. Emissions from the radiotracer within the patient are detected over time. A collimator in front of the detector limits the direction of photons detected by the detector, so each detected emission is associated with an energy and line of response (e.g., a cone of possible locations from which the emission occurred). For SPECT, the detector may be rotated or moved relative to the patient, allowing detection of emissions from different angles and/or locations in the patient, or any other way of creating a tomographically suited dataset from single photon emissions. In PET embodiments, the detector is formed in a ring so that coincidence is used to detect the same emission from different directions along the lines of response.

The detector includes direct detection with CZT or indirect conversion (e.g., NaI, LSO layered scintillation crystal) using photomultiplier tubes, SiPM, or other photon detectors. For SPECT, the SiPM detectors are arranged along a rectangular or other grid to provide a two-dimensional planar array for detecting gamma radiation. For PET, the photomultiplier tubes are arranged in a ring around a patient. Other types of detectors may be used, such as any gamma detector.

In act 22, a reconstruction processor reconstructs an image object from acquired projection data. Computed tomography implements reconstruction to determine a spatial distribution of emissions from the detected lines of response. The projection data represents the detected emissions. The quantity or amount of uptake for each location (e.g., voxel) may be estimated as part of the reconstruction. The nuclear imaging system may estimate the activity concentration of an injected radiopharmaceutical or tracer for the different locations.

Any now known or later developed reconstruction methods may be used, such as based on Maximum Likelihood Expectation Maximization (ML-EM), Ordered Subset Expectation Maximization (OSEM), penalized weighted least squares (PWLS), Maximum A Posteriori (MAP), multi-modal reconstruction, non-negative least squares (NNLS), or another approach. Different types of reconstruction have different strengths and weaknesses. Different processes for dealing with motion or other sources of distortion may be used for a same method, resulting in yet other types of reconstruction. Some types of reconstruction may take longer or have lesser resolution, such as results from dealing with motion.

The reconstruction is iterative. The image reconstruction processor uses a system matrix H to describe the properties of the nuclear imaging system and uses an iteratively improved data model to calculate the image object I based on the data set D of detected emissions. The iterative reconstruction forward projects a current estimate of the object or image (e.g., object or image space) to projection or data space using a system matrix or forward projectors representing the detection. Since the detected emissions are in a projection space (e.g., generally known location in two-dimensions but not three), the forward projection of the current volume is compared to the detected or measured emissions. This comparison is tested for accuracy with a merit function (e.g., NNLS, or Mighell's modified chi square). If sufficiently accurate and/or having no further increase in accuracy, the iteration ceases and the current image object is output as the reconstructed image object. If the merit function indicates insufficient or improving accuracy, a difference or residual between the forward projection and the detected emissions is backward projected. This backward projection provides a gradient or change for the image object. The direction and step size is determined for the change and is applied to update the image object. The process is then repeated for another iteration of the reconstruction. Once complete, an image object I, which may be an N-dimensional image object (typically N=3 in medical imaging applications), may then be displayed on display using a volume rendering technique.

An "object" or "image object" is defined in an object space (also referred to as image space) and is a reconstruction of the data set D measured in a data space. The object space is the space in which the result of the image reconstruction is defined and which corresponds to the volume that was imaged using the nuclear imaging system (the input object, such as a patient, provided to the nuclear imaging system). The image object may be a three-dimensional (3D) image object or may have any other dimensionality, e.g., for N-dimensional imaging.

In act 24, the reconstruction processor forward projects the current image or volume to the data space. The forward projection is of the image object to a data model in the data space. The forward projection projects an input object $I_{object}$ from object space into data space to yield the data model $M_{data}$ of the input object $I_{object}$. The input object $I_{object}$ is either an estimated object (e.g., an initial image object $I_0$ or a preceding updated object $I_{update}$ in an iterative update process) or any object defined in object space.

In one embodiment, the forward projection of act 24 is performed as part of the iterative reconstruction of act 22. The forward projection is performed to test a current image object relative to the detected emissions. The forward projection is of an initial image object or any further iterations of the image object. In other embodiments, the reconstruction completes. The merit function indicates that a current image object is satisfactory or has minimized residuals. This final image object of the reconstruction may be forward projected to test the merit with the merit function or forward projected just for assessing reconstruction quality after the reconstruction indicates completion or an end of the iterative process.

To forward project, the image object is transformed with a system matrix for the nuclear imaging system (detector). The forward projection multiplies a system matrix or projection operators with the current volume to emulate the detection by the nuclear imaging system. The reconstruction includes projection operators (i.e., forward projector) that incorporate the effects of the detector on the photons (i.e., collimation and detection process) for a patient and isotope. The forward projector contains a model of the imaging formation process specific to the detector and/or imaging system. The image formation model includes the interaction of photons with patients (e.g., attenuation and scatter), the collimation-detection process (e.g., collimator detector response including collimator geometric response, septal penetration and scatter, partial deposition in crystal and detector intrinsic resolution), and related radionuclide properties (e.g., emission abundances).

The system matrix is the mathematical representation of the projection from the object space to the projection space (e.g., forward projector). In some nuclear imaging systems, such as SPECT for small animal imaging, the system matrix is stored and used directly in each iteration to calculate the projection data model from a current estimate of the activity distribution. In most clinical nuclear imaging systems, due to the very large dimension of the system matrix, the system matrix is not stored. Instead, a series of mathematical projection operators, collectively called the forward projector, are performed in each iteration. The projection operators mathematically provide multiplication by the system matrix.

In one representation for SPECT, the forward projection is an application of the system matrix H to an object in object space. Projecting an estimated image $I_\alpha$ (where $\alpha$ represents a measurement angle) into data space results in a data model $M_i$ of that estimated image:

$$M_i = \sum_\alpha H_{i\alpha} I_\alpha$$

Representing the system matrix as a product of operators yields $$H = H_n \otimes_{\square} \ldots \otimes H_2 \otimes_{H_1}$$

Other representations may be used.

To assess the reconstruction quality, the reconstruction processor calculates, in act 26, statistical measures of differences between the data model of computed tomography and detected emissions in the nuclear imaging. This difference is different than the residuals used to reconstruct. The statistical measure is different than the merit function used to determine modification of the image object through backward projection. Alternatively, the statistical measure is also used as the merit function.

The differences between the values of the measured data set D and those of the data model M are residuals. In other words, residuals refer to the difference between the counts (e.g., photon counts) displayed or predicted by a processed image object (image) and the actual counts obtained. In some embodiments, residuals are used to assess reconstruction quality and/or identify problematic images. The standard deviation of residuals of Poisson-distributed counts depends on the signal strength and therefore varies from one location in an image to another.

A well-known, objective statistical measure, which is well behaved at low counts, is the cumulative distribution function (CDF). The CDF is the probability $P(count \leq n | m)$ of obtaining a Poisson count of n or less when the expected Poisson count is m. Because the probability of obtaining exactly k counts (k being a non-negative integer) is:

$$P(k; m) = \frac{e^{-m} m^k}{k!}$$

the CDF is given by:

$$CDF(n|m) = \sum_{k \leq n} \frac{e^{-m} m^k}{k!}.$$

The Poisson cumulative distribution function described herein is an example. Other cumulative distribution functions may be used. Other statistical measures than CDF may be used.

The use of the CDF in reconstruction quality assessment is to determine whether a reconstructed tomographic image is consistent with the underlying Poisson distribution of the input counts. Each data pixel i in a slice (e.g., 2D slice) of image data (or each voxel i in data of dimensionality higher than two, e.g., 3D) has an associated predicted count $m_i$ and an observed count $n_i$. Image objects may be represented as multiple 2D slices, which may be displayed individually. The term "pixel" is used herein in the context of slices, with the understanding that a pixel may correspond to a voxel of an image object (e.g., a 3D image object). $n_i$ is a random Poisson realization of $m_i$. If this hypothesis is correct, the distribution of the CDF values $p_i$ of the pixels (for various i) will be homogeneously distributed on [0,1] and will be independent from one pixel to the next (i.e., there will be no positional correlation of the values $p_i$).

A MCDF may be calculated instead of CDF. A technical difficulty in evaluating whether the distribution of the CDF is homogeneous and spatially uncorrelated is because Poisson counts may only take on integer values, so the CDF is piecewise constant with discontinuities at integer points. At the discontinuities, the CDF is only bracketed between a lower bound and an upper bound but is otherwise undetermined. To avoid this ambiguity, a random component is added at the discontinuities to provide the following modified Poisson CDF (MCDF):

$$MCDF(n|m) = CDF(n|m) + [CDF(n+1|m) - CDF(n|m)]$$
$$*RANDOMU(seed),$$

where RANDOMU is a uniform random distribution on the interval [0,1] and seed is a seed value provided to a pseudorandom number generator.

The MCDF is 3D matrix representing mcdfs of all views, computed during the reconstruction, and is a measure in data space.

The MCDF or other statistical measure provides a value in data space for each pixel or voxel. A value may be provided for each bin of a MCDF histogram. This provides a distribution of values across pixels or voxels. For each location of the distribution, a value in the range of [0, 1] is provided. Other ranges or different resolutions may be used.

Figure 2:
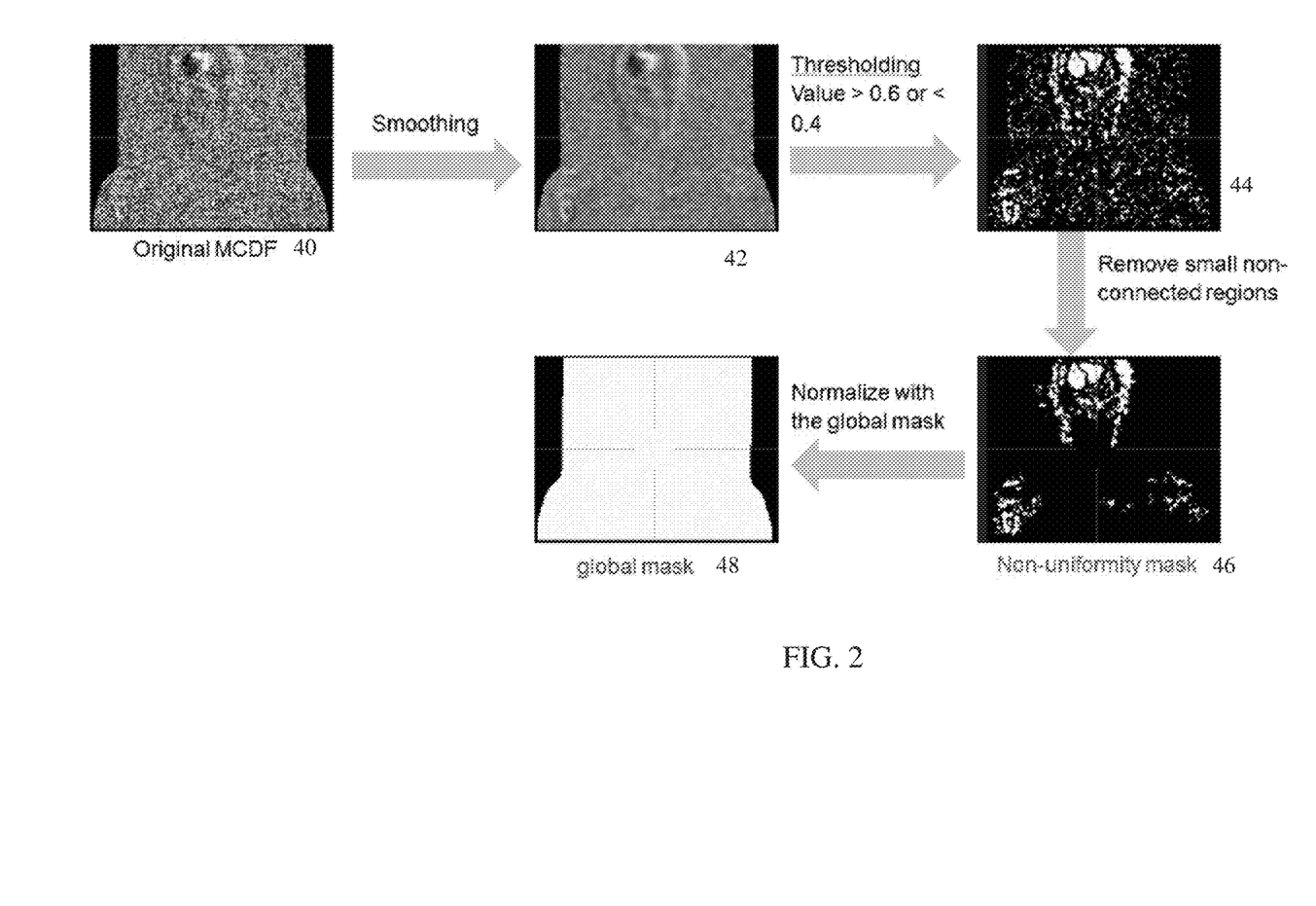
FIG. 2 illustrates an example determination of reconstruction quality.

The distribution of MCDF or other statistical measure may be imaged. The resulting image may be used to assess reconstruction quality. For example, FIG. 2 shows an original MCDF 40 displayed as a 2D image. This original MCDF 40 does not necessarily represent anatomy of the patient, but instead represents statistical analysis of the residuals or amount of matching between the data model and the detected emissions in data space.

To identify localized artifacts and/or to assist a radiologist in understanding information in the MCDF, the reconstruction processor determines a value for a level of local non-uniformity in the distribution of the MCDF in act 28. Any calculation of variation in the statistical measures through the distribution may be used, such as gradient based calculation.

In one embodiment, the value is determined as a single value for the distribution of the MCDF. For example, an integer or real value over a given range (e.g., [0, 1] or 0%-100%) is determined. The single value indicates a level of localized non-uniformity for a region or the entire distribution (i.e., region of interest of the patient). The value (e.g., 0.2) may be more easily interpreted than the image of the distribution (e.g., than original MCDF 40). Thresholds, annotation, or labeling may be used to indicate the significance of the value (e.g., 0.9 non-uniformity indicates substantial motion artifacts in the forward projected image object). In alternative embodiments, more than one value for a given forward projection or image object is determined.

Any measure of variation of the original MCDF may be used. In one embodiment, connected regions in the distribution of the MCDF are identified. The average size, number, and/or other characteristic of the connected regions may be used as the measure of variation. Morphological processes may be applied.

FIG. 2 represents one embodiment of measuring the variation. A local non-uniformity mask 46 is calculated and compared to a global mask 48. The local non-uniformity may be used without the comparison to the global in other embodiments.

To create the local non-uniformity mask 46, the original MCDF 40 is smoothed. Any low pass, directional, and/or other filtering may be applied. Region growing may alternatively or additionally be used. The result is a smooth distribution of MCDF 42.

The smoothed MCDF 42 is then thresholded. Any pixels, voxels, or bins with an MCDF value, after smoothing, above or below a mean are identified. Any range of values to include may be used. The mean is 0.5 in this example. The locations with values above 0.6 or below 0.4 are identified by thresholding. Other thresholds may be used. Only values above or only values below may be identified. The result of thresholding is a binary mask 44. Locations identified as a threshold amount from the mean are labeled differently than locations within the threshold amount from the mean. For example, a 0 value is assigned to values close to the mean and a 1 value is assigned to values further from the mean. In alternative embodiments, a binary operation is not used. Instead, the MCDF values for the locations are mapped to different ranges.

Regions in the binary mask 44 may be removed. The size of a given region is used, but another criterion may be used. The non-zero locations may or may not be connected to other non-zero locations. Any connected non-zero locations are grouped. Each non-connected non-zero location is treated as a group as well. The size or number of connected locations for each group is used to determine whether to remove the group. For example, any group with twenty or fewer locations as members is removed. Any size or number may be used. Other criteria may be used, such as a shape of the group. The removal is implemented by setting the mask value to 0 for the locations of the removed group. The non-uniformity mask 46 results from the removal of small non-connected regions.

In alternative embodiments, the variation in the original MCDF 40 or the smoothed MCDF 42 is used without masking. Image processing to enhance or isolate distinguishing qualities in the variation of MCDF may be applied. The local variation or non-uniformity may be used alone to indicate reconstruction quality.

In other embodiments, the non-uniformity is compared to provide the reconstruction quality. The local non-uniformity mask 46 is used for comparison with a global mask 48. The global mask 48 is determined by thresholding and a morphological operation. The original MCDF 40 or the smoothed MCDF 42 are thresholded. The threshold is different than applied for local non-uniformity. Any values within a larger range of the mean are set to 1. For example, the range is 0.3-0.7. Other ranges may be used.

A morphological operation is applied to the results of the thresholding. Erosion, region growing, other operations, or combinations thereof are applied. Low pass filtering may be applied. Hole filling may be applied, such as filling any wholes surrounded by locations with sufficient response. The thresholding and morphological operation identify locations of the MCDF distribution corresponding to emissions or to the patient. The global mask 48 identifies the extent of the patient or region of interest as determined from MCDF. Other information may be used to determine a mask of the distribution of the data model.

Any comparison of the non-uniformity mask 46 to the global mask 48 may be used. For example, a sum of differences is used. As another example, a ratio of deviation of the local non-uniformity mask 46 from the global mask 48 is calculated. The ratio is of the local non-uniformity mask 46 of the statistical measures to the global mask 48 of the statistical measures. In one embodiment, the ratio is a sum of an absolute value of deviation of the local non-uniformity from a mean to a sum of an absolute value of deviation of the global mask from the mean. This is represented as:

$$R = \frac{\sum_{x \in M_{nu}} |f(x) - 0.5|}{\sum_{x \in M_{gl}} |f(x) - 0.5|}$$

where f(x) is the MCDF value at voxel x (assuming a 3D mask) or pixel x (assuming a 2D mask), $M_{nu}$ is the local non-uniformity mask 46, and $M_{gl}$ is the global mask 48. 0.5 is the mean, so the ratio is of a sum of differences of the mask from the mean over the distribution of the MCDF. Other ratios may be used. The ratio may be calculated for the MCDF without the masking.

More than one value may be determined. For example, different mask generation, image processing for the MCDF, or other processes may be used to assess different artifacts.

In act 30, the reconstruction processor outputs an indication of a quality of the reconstruction. The indication is based on the value from or for the comparison and/or the variation in MCDF. The value itself may be the indication. The amount or level is output. For example, the indication is a quality score reduced from all the 3D data of the MCDFs into one value that may be used for comparison. The value may be compared to one or more ranges and annotations for the range in which the value fits may be output. For example, the value may indicate poor quality due to motion or poor quality due to calibration error. Thresholds, look-up tables, or mapping is used to identify the reconstruction quality from the value. The variation or local non-uniformity and/or the ratio indicates the reconstruction quality and/or source of artifact or poor quality.

The output is an image. For example, the image is of the value or information derived from the value. As another example, the image is a nuclear imaging image, such as a three-dimensional rendering from the reconstructed object image. An image of the patient or part of the patient is generated from the reconstruction resulting from act 22. The results of the reconstruction represent a distribution of emissions or counts of emissions in N-dimensions. For qualitative SPECT, this distribution is used to generate an image. For quantitative SPECT, the activity concentration for each location (e.g., voxel) is determined. The reconstruction provides voxel values representing activity concentration. In one embodiment, data for one or more (e.g., multi-planar reconstruction) planes is extracted (e.g., selected and/or interpolated) from a volume or voxels and used to generate a two-dimensional image or images. The quality assessment value or information derived from the value is overlaid on, used to color, presented as an annotation, or otherwise indicated on the image of emissions from the patient.

The output may be a transmission. The transmission is of the value or information derived from the value to a display, such as in an image. The transmission may be to a memory through a memory interface and/or to a patient medical record, server, or other computer connected through a network interface. The indication of the reconstruction quality is transmitted as part of the nuclear imaging.

Other information based on the value from local non-uniformity or the comparison may be output. A recommendation is output. The reconstruction quality information may indicate a source of poor quality. For example, a value of the ratio within a range (e.g., higher than a threshold amount) indicates motion causing artifacts. A recommendation to use a different type of reconstruction is output. A specific type of reconstruction may be recommended, such as a type of reconstruction less susceptible to or having an appropriate level of motion correction. As another example, the value of the ratio within a same or different range indicates image degradation due to calibration errors. Different calibration data may be used for the system matrix in reconstruction account for the error, or a recommendation to have the nuclear imaging system re-calibrated is output. Any one or more recommendations may be output based on a value or values of reconstruction quality.

As an alternative or in addition to communicating the reconstruction quality, the reconstruction of act 22 may be repeated. A different type of reconstruction (e.g., reconstruction with different settings) is used for the repetition. The same emissions are used, but with different reconstruction to reduce or eliminate the artifacts or sources of poor reconstruction quality. In response to the indication of poor reconstruction quality, the reconstruction is repeated.

The operator or radiologist may select the initial type of reconstruction or corrections or correction parameters. After the initial reconstruction, the different type of reconstruction is selected by the operator or radiologist where the image has insufficient quality. The value or corresponding recommendation may be used to guide the selection or the operator may rely on their expertise. Alternatively, a default or application-specific reconstruction is initially selected. For repetition, the value is mapped to a different type of reconstruction. Different sources of image degradation may have result in different values, so that the value is mapped to the type of reconstruction to more likely or better overcome the source of degradation.

In one embodiment, the source is assumed to be motion. The initial type of reconstruction is application specific or a default. When the resulting image object is associated with a value showing sufficiently poor reconstruction quality, then the poor reconstruction quality is treated as being due to motion. The reconstruction is repeated, but with a default or settings more directed to reducing the effects of motion. The source may be assumed to be due to other causes in other embodiments.

FIG. 3 shows a nuclear imaging system 10. The system 10 is a PET, SPECT, or other imaging system for detecting emissions due to radioactive decay in a patient. The nuclear imaging system 10 may provide qualitative or quantitative imaging.

The system 10 implements the method of FIG. 1 or other method. The quality of a reconstructed object is determined in data space. The reconstructed object is forward projected. A statistical measure, such as MCDF, is performed on the data model from the forward projection. The residuals from comparison of the data model to the detected emissions may be used for the statistical measure. Local variation or non-uniformity in the statistical measure are analyzed to assess reconstruction quality.

The nuclear imaging system 10 includes a reconstruction processor 12, a memory 14, a display 16, and a detector 18. The processor 12, memory 14, and/or display 16 are part of the imaging system with the detector 18 or are separate (e.g., a computer or workstation). Additional, different, or fewer components may be provided. For example, the system 10 is a computer without detector 18. As another example, user input, patient bed, x-ray scanner, or other nuclear imaging-related devices are provided. Other parts of the system 10 may include power supplies, communications systems, and user interface systems.

The detector 18 is a gamma camera connected with a gantry. The gamma camera is a planar photon detector, such as having crystals or scintillators with photomultiplier tubes, SiPM, or another optical detector. Any now known or later developed gamma camera may be used. The gantry rotates the gamma camera about the patient. Alternatively, the detector 18 is a ring of crystals or scintillators with photomultiplier tubes or other optical detectors. Other structures of detectors may be used. Other components may be provided, such as a collimator.

The nuclear imaging system 10, using the detector 18, detects emissions from the patient 22 for measuring uptake or physiological function. During scanning of a patient, the detector 18 detects emission events. The emissions occur from any location in a finite source (i.e., the patient). The radiotracer in the patient migrates to, connects with, or otherwise concentrates at specific types of tissue or locations associated with specific biochemical reactions. Thus, a greater number of emissions occur from locations of that type of tissue or reaction. As a gamma camera, the emission events are detected at different positions or angles relative to the patient, forming lines of response for the events. With a ring of detectors, the emissions are detected along the lines of response without movement of the detector 18. The patient bed may move to define a field of view relative to the patient.

The reconstruction processor 12 is a general processor, digital signal processor, graphics processing unit, application specific integrated circuit, field programmable gate array, digital circuit, analog circuit, combinations thereof, or other now known or later developed device for reconstructing an image object from detected emissions. The reconstruction processor 12 is a single device, a plurality of devices, or a network. For more than one device, parallel or sequential division of processing may be used. Different devices making up the reconstruction processor 12 may perform different functions, such as one processor (e.g., application specific integrated circuit or field programmable gate array) for reconstructing the object and another (e.g., graphics processing unit) for rendering an image from the reconstructed image object. One of the two or a third processor (e.g., a controller) of the reconstruction processor 12 assesses reconstruction quality. In one embodiment, the reconstruction processor 12 is a control processor or other processor of nuclear imaging system 10. In other embodiments, the reconstruction processor 12 is part of a separate workstation or computer.

The processor 12 operates pursuant to stored instructions to perform various acts described herein, such as reconstructing of act 22, calculating the statistical measure in act 26, determining a level of local non-uniformity in act 28, and generating an image of act 30.

The reconstruction processor 12 is configured by software, firmware, and/or hardware to reconstruct a volume or object from emissions. Any reconstruction may be used to estimate the activity concentration or distribution of the tracer in the patient. The reconstruction processor 12 accesses the detected emission events from the memory 14, from the detector 18, or buffers to reconstruct. The detected emissions are used to reconstruct the distribution of the radioisotope in three dimensions. Forward and backward projection are used iteratively until a merit function indicates completion of the reconstruction (i.e., a best or sufficient match of the image object to the detected emissions).

The reconstruction processor 12 generates one or more images based on the reconstruction. Any given image represents the emissions from the patient. The image shows the spatial distribution, such as with a multi-planar reconstruction or a volume rendering. For quantitative imaging, the image represents accurate measures (e.g., in Bq/ml) of the activity concentration. Alternatively or additionally, the image shows a quantity or quantities (e.g., alphanumeric) representing the activity concentration or specific uptake values for one or more locations or regions.

The reconstruction processor 12 is configured to quantify an amount of non-uniformity in a statistical measure of difference between a data model and the detected emissions. The residuals between the data model and the detected emissions are determined. The statistical measure is calculated using the residuals. Any statistical measure may be used, such as MCDF. This calculation in data space provides a distribution of the statistic through the histogram or pixels or voxels. A variation over the distribution is determined. Any measure of variation may be used. In one embodiment, a local non-uniformity mask is calculated. A ratio of the local non-uniformity mask to a global mask is calculated. The sum across the distribution provides a value representing the amount of non-uniformity.

The amount of non-uniformity indicates the quality of the reconstructed object. The amount may be used to indicate the quality, mapped to a recommendation, and/or to control a repeat of reconstruction using a different reconstruction algorithm and/or settings.

The display 16 is a CRT, LCD, plasma screen, projector, printer, or other output device for showing an image. The display 16 displays an image of the reconstructed functional volume. The quality assessment is included as part of the image. An annotation, overlay graphic, color modulation, or other indication of the calculated quality of the image is output with or separately from the image. The quality is indicated with the amount of the non-uniformity or information derived from the amount. For example, an annotation may indicate that the image includes undesired motion artifact or image degradation based on the amount. The single amount or information derived from the single amount is used to communicate the reconstruction quality and/or source of poor quality.

The detected emission events, counts, location, or other detection information are stored in the memory 14. The memory 14 may store data at different stages of processing, such as a data model, residuals, values for a statistical measure, filtered data, thresholded data, results from morphological processing, masks, levels of non-uniformity, ratios, sums of deviation, or other data. Projection operators, transposed operators, a measure of completeness of reconstruction, merit function data, the reconstructed object, system matrix, thresholds, results of calculations, an image to be displayed, an already displayed image, or other data may be stored. The data is stored in any format.

The memory 14 is a buffer, cache, RAM, removable media, hard drive, magnetic, optical, database, or other now known or later developed memory. The memory 14 is a single device or group of two or more devices. The memory 14 is part of the nuclear imaging system 10 or a remote workstation or database, such as a PACS memory.

The memory 14 is additionally or alternatively a non-transitory computer readable storage medium with processing instructions. The memory 14 stores data representing instructions executable by the programmed processor 12. The instructions for implementing the processes, methods, and/or techniques discussed herein are provided on non-transitory computer-readable storage media or memories, such as a cache, buffer, RAM, removable media, hard drive, or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for assessment of reconstruction quality in medical imaging, the method comprising:
    detecting, with a nuclear imaging detector, emissions from a patient;
    reconstructing an image object from the emissions;
    forward projecting from the image object to a data model in data space;
    calculating a modified cumulative distribution function from the data model, the modified cumulative distribution function having a distribution of values across pixels or voxels;
    identifying values of the modified cumulative distribution function located greater than a first threshold from a mean value of the modified cumulative distribution function;
    creating a binary mask to distinguish values within the first threshold from the values identified to be greater than the first threshold;
    removing at least one non-connected region in the binary mask to create a local non-uniformity mask of the modified cumulative distribution function;
    creating a global mask of the modified cumulative distribution function by applying a second threshold to the modified cumulative distribution function, the second threshold being greater than the first threshold;
    comparing the local non-uniformity mask to the global mask;
    determining a value for a level of local non-uniformity in the distribution of the modified cumulative distribution function based on results of comparing the local non-uniformity mask to the global mask; and
    outputting an indication of a quality of the reconstructing, the indication being a function of the value.

2. The method of claim 1 wherein detecting comprises detecting the emissions with a single photon emission computed tomography or a positron emission tomography system.

3. The method of claim 1 wherein forward projecting comprises forward projecting as an iteration in the reconstructing.

4. The method of claim 1 wherein forward projecting comprises forward projecting the image object resulting from the reconstructing ending.

5. The method of claim 1 wherein forward projecting comprises transforming the image object with a system matrix for the nuclear imaging detector.

6. The method of claim 1 wherein calculating comprises calculating the modified cumulative distribution function in the data space over a range of [0, 1] for each location of the distribution.

7. The method of claim 1 wherein determining the value comprises determining the value as a single value for the distribution of the modified cumulative distribution function.

8. The method of claim 1 wherein determining comprises identifying connected regions in the distribution of the modified cumulative distribution function.

9. The method of claim 8 wherein identifying comprises smoothing the distribution of the modified cumulative distribution function, thresholding results of the smoothing, and removing regions based on size remaining after the thresholding.

10. The method of claim 1, comparing the local non-uniformity mask to the global mask includes determining a ratio of deviation of the local non-uniformity from the global mask.

11. The method of claim 10, determining the ratio includes determining the ratio of a sum of an absolute value of deviation of the local non-uniformity from the mean to a sum of an absolute value of deviation of the global mask from the mean.

12. The method of claim 1 wherein outputting comprises outputting a recommendation to use a different type of reconstruction when the value is above a threshold.

13. The method of claim 1 wherein outputting comprises outputting the indication as motion, calibration, or motion and calibration artifacts being in the image object.

14. The method of claim 1 further comprising repeating the reconstructing with a different type of reconstruction, the repeating being in response to the indication.

15. A non-transitory computer readable storage medium having stored therein data representing instructions executable by a programmed processor for assessment of reconstruction quality in nuclear imaging, the storage medium comprising instructions for:
    calculating statistical measures of residual photon count differences between an estimated image data model of computed tomography and a measured data set of detected emissions in the nuclear imaging;
    identifying values of the statistical measures located greater than a first threshold from a mean value of the statistical measures;
    creating a binary mask to distinguish values within the first threshold from the values identified to be greater than the first threshold;
    removing at least one non-connected region in the binary mask to create a local non-uniformity mask of the statistical measures;
    creating a global mask of the statistical measures by applying a second threshold to the statistical measures, the second threshold being greater than the first threshold;
    comparing the local non-uniformity mask to the global mask;
    determining a value for a level of local non-uniformity in the distribution of the statistical measures based on results of comparing the local non-uniformity mask to the global mask;
    and
    transmitting an indication of the reconstruction quality in the nuclear imaging, the reconstruction quality based on the value.

16. The non-transitory computer readable storage medium of claim 15, calculating the statistical measures includes calculating a distribution in data space of the modified cumulative distribution function.

17. The non-transitory computer readable storage medium of claim 15, determining the value includes calculating a ratio of the local non-uniformity mask of the statistical measures to the global mask of the statistical measures.

18. The non-transitory computer readable storage medium of claim 15, determining the value includes smoothing the statistical measures, thresholding results of the smoothing, and removing small regions resulting from the thresholding.

19. A nuclear imaging system comprising:
   a detector configured to detect signals from a patient;
   a reconstruction processor configured to reconstruct an image of the signals from the patient and to quantify an amount of local non-uniformity in a statistical measure of residual photon count difference between an estimated image data model and a measured data set of the detected signals;
   identifying values of a modified cumulative distribution function located greater than a first threshold from a mean value of the modified cumulative distribution function;
   obtaining the local non-uniformity by removing at least one non-connected region among the identified values; and
   a display configured to display the image and a quality of the reconstruction, the quality being a function of the amount of the local non-uniformity.

20. The nuclear imaging system of claim 19 wherein the quality indicates motion artifact or image degradation with a single value.

* * * * *